(12) United States Patent
Hench et al.

(10) Patent No.: US 7,864,692 B1
(45) Date of Patent: Jan. 4, 2011

(54) METHOD AND APPARATUS FOR THE PREDICTION AND OPTIMIZATION IN IMPAIRED COMMUNICATION SYSTEMS

(75) Inventors: John Josef Hench, San Jose, CA (US); Thorkell Gudmundsson, San Jose, CA (US); Ioannis Kanellakopoulos, Cupertino, CA (US); Sunil C. Shah, Los Altos, CA (US); Gurcan Aral, Cupertino, CA (US); Yaolong Tan, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 224 days.

(21) Appl. No.: 09/710,487

(22) Filed: Nov. 10, 2000

Related U.S. Application Data

(60) Provisional application No. 60/164,986, filed on Nov. 11, 1999, provisional application No. 60/181,125, filed on Feb. 8, 2000, provisional application No. 60/183,675, filed on Feb. 18, 2000, provisional application No. 60/165,399, filed on Nov. 11, 1999.

(51) Int. Cl.
*H04L 12/26* (2006.01)

(52) U.S. Cl. ........................................ 370/252

(58) Field of Classification Search .................. 370/251, 370/252, 253, 201, 316, 317, 465, 468; 455/1, 455/63; 466/1, 63.1; 375/144, 148; 703/1, 703/2

See application file for complete search history.

(56) References Cited

U.S. PATENT DOCUMENTS

| | | | |
|---|---|---|---|
| 3,814,868 A | 6/1974 | Bradley | |
| 4,649,505 A | 3/1987 | Zinser, Jr. et al. | |
| 4,669,113 A | 5/1987 | Ash et al. | |
| 4,669,505 A | 6/1987 | Nelson et al. | |
| 4,715,064 A | 12/1987 | Claessen | |
| 4,760,596 A | 7/1988 | Agrawal et al. | |
| 4,987,569 A | 1/1991 | Ling et al. | |
| 5,063,351 A | 11/1991 | Goldthorp et al. | |
| 5,157,690 A | 10/1992 | Buttle | |
| 5,226,041 A | 7/1993 | Waclawsky et al. | |
| 5,319,636 A | 6/1994 | Long et al. | |
| 5,329,547 A | 7/1994 | Ling | |
| 5,343,461 A | 8/1994 | Barton et al. | |

(Continued)

FOREIGN PATENT DOCUMENTS

| | | | |
|---|---|---|---|
| EP | 0917314 A2 | 5/1999 |
| EP | 0917314 A3 | 10/2001 |
| WO | WO-98/52312 A2 | 11/1998 |
| WO | WO-98/52312 A3 | 11/1998 |

OTHER PUBLICATIONS

PCT Search Report, PCT/US00/42097, Nov. 10, 2000, Date of Mailing: Jun. 26, 2001 (5 pgs.).
PCT Search Report, PCT/US00/30859, Nov. 10, 2000, Date of Mailing Mar. 27, 2001 (5 pgs.).
PCT Search Report, PCT/US00/30858, Nov. 10, 2000, Date of Mailing: Mar. 16, 2001 (7 pgs.)
PCT Search Report, PCT/US00/30887, Nov. 11, 1999, Date of Mailing Aug. 9, 2001 (24 pgs.).

(Continued)

*Primary Examiner*—Anh-Vu Ly
(74) *Attorney, Agent, or Firm*—Wood, Herron & Evans, LLP

(57) ABSTRACT

A method and apparatus are disclosed for the prediction and optimization of a communications system. The present invention provides for the prediction and optimization of the performance of a communications system comprising the steps of inputting a plurality of channels, predicting a performance of each channel using a plurality of parameters to characterize the performance of the channel, and possibly optimizing the parameters of each channel according to a design criteria.

30 Claims, 12 Drawing Sheets

U.S. PATENT DOCUMENTS

| | | | |
|---|---|---|---|
| 5,406,552 A | | 4/1995 | Long et al. |
| 5,521,971 A | | 5/1996 | Key et al. |
| 5,548,222 A | | 8/1996 | Jensen et al. |
| 5,761,614 A | * | 6/1998 | Leitch et al. ................. 455/254 |
| 5,848,151 A | | 12/1998 | Boudy |
| 5,862,157 A | * | 1/1999 | Bessios ........................ 317/48 |
| 5,880,959 A | | 3/1999 | Shah et al. |
| 5,887,032 A | | 3/1999 | Cioffi |
| 5,926,538 A | | 7/1999 | Deryugin et al. |
| 5,929,896 A | | 7/1999 | Goodman et al. |
| 5,995,566 A | | 11/1999 | Rickard et al. |
| 6,055,297 A | | 4/2000 | Terry |
| 6,091,713 A | * | 7/2000 | Lechleider et al. .......... 370/428 |
| 6,160,790 A | | 12/2000 | Bremer |
| 6,161,209 A | | 12/2000 | Moher |
| 6,172,970 B1 | * | 1/2001 | Ling et al. ................... 370/347 |
| 6,195,594 B1 | | 2/2001 | Shah et al. |
| 6,230,062 B1 | | 5/2001 | Shah |
| 6,249,762 B1 | | 6/2001 | Kirsteins et al. |
| 6,317,495 B1 | * | 11/2001 | Gaikwad et al. ............ 379/417 |
| 6,377,636 B1 | * | 4/2002 | Paulraj et al. ............... 375/346 |
| 6,434,233 B1 | | 8/2002 | Bjarnason et al. |
| 6,442,495 B1 | | 8/2002 | Fleming-Dahl |
| 6,520,744 B1 | * | 2/2003 | Verbin et al. ................. 370/252 |
| 6,625,255 B1 | * | 9/2003 | Green et al. ............... 379/1.04 |

OTHER PUBLICATIONS

PCT Search Report, PCT/US00/31026, Nov. 10, 2000, Date of Mailing Jan. 22, 2001 (7 pgs.).

Honig, M.L. et al, "Suppression of Near- and Far-End Crosstalk by Linear Pre- and Post-Filtering", Selected Areas in Communications IEEE Journal on. vol. 10 Issue 3, Apr. 1992, pp. 614-629, entire document.

Lennart Ljung, IEEE Transactions on Automatic Control, vol. AC-23, No. 5, Oct. 1978, "Convergence Analysis of Parametric Identification Methods", pp. 770-783.

Sergio Verdu, Cambridge University Press, "Multiuser Detection", 1998, pp. 1-26, 56-66, 154-175, 384-387.

Guanghan Xu et al., IEEE Transactions on Signal Processing, vol. 43, No. 12, Dec. 1995, "A Least Squares Approach to Blind Channel Identification", pp. 2982-2993.

Alexandra Duel-Hallen et al., IEEE Transactions on Communications, vol. 37, No. 5, May 1989, "Delayed Decision-Feedback Sequence Estimation", pp. 428-436.

K. Giridhar et al., IEEE Transactions on Communications, vol. 45, No. 4, Apr. 1997, "Nonlinear Techniques for the Joint Estimation of Cochannel Signals", pp. 473-484.

Lang Tong et al., IEEE Transactions on Signal Processing, vol. 47, No. 9, Sep. 1999, "Joint Order Detection and Blind Channel Estimation by Least Squares Smoothing", pp. 2345-2355.

Eric Moulines et al., IEEE Transactions on Signal Processing, vol. 43, No. 2, Feb. 1995, "Subspace Methods for the Blind Identification of Multichannel FIR Filters", pp. 516-525.

Alexandra Duel-Hallen et al., IEEE Personal Communications, Apr. 1995, "Multiuser Detection for CDMA Systems", pp. 46-58.

Upamanyu Madhow et al., IEEE Transactions on Communications, vol. 42, No. 12, Dec. 1994, "MMSE Interference Suppression for Direct-Sequence Spread-Spectrum CDMA" pp. 3178-3188.

C. Richard Johnson, Jr. et al., Proceedings of the IEEE, vol. 86, No. 10, Oct. 1998, "Blind Equalization Using the Constant Modulus Criterion: A Review", pp. 1927-1950.

P. Ciblat et al., "Asymptotic Analysis of Blind Cyclic Correlation Based Symbol Rate Estimation", Sep. 2000.

Dr. Dennis J. Rauschmayer, Macmillan Technology Series, "ADSL/VDSL Principles" , 1999, pp. 131-155.

Lennart Ljung, Prentice-Hall Information and System Sciences Series, "System Identification, Theory for the User", 1987, pp. 141-163, 239-263.

Yaakov Bar-Shalom et al., Artech House, Inc., "Estimation and Tracking: Principles, Techniques, and Software", 1993, pp. 450-465.

International Telecommunication Union, ITU-T Telecommunication Standardization Sector of ITU, G.810, "Definitions and Terminology for Synchronization Networks", Aug. 1996, pp. 1-20.

ADSL Forum Technical Report TR-024 for Network Management Working Group, "DMT Line Code Specific MIB", Jun. 1999 pp. 1-7.

J. Cioffi, EEE379A, Digital Communication: Signal Processing Class notes, Stanford University, pp. 167-174, 194-197, 1997.

Arthur Gelb et al., The Analytic Sciences Corporation, "Applied Optimal Estimation", 1974, pp. 156-179.

Simon Haykin, Prentice Hall Information and System Sciences Series, "Adaptive Filter Theory", Third Edition, 1996, pp. 772-815.

Ian R. Petersen et al., Control Engineering, "Robust Kalman Filtering for Signal and Systems with Large Uncertainties", 1999, pp. 35-55.

Stephen Boyd et al., "Convex Optimization", Course Reader for EE364: Introduction to Convex Optimization with Engineering Applications, Stanford University, Winter Quarter 1996-1997, pp. 1-146.

Amit Mathur, Dissertation from Electrical and Computer Engineering, University of California, Santa Barbara, "Algorithms for Cochannel Source Separation and Signal Estimation", Dec. 1996, pp. 1-165.

Edward A. Lee et al., Kluwer Academic Publishers, "Digital Communication", Second Edition, 1994, pp. 408-424, 468-486.

Thomas Starr et al., Prentice Hall, Communication Engineering and Emerging Technologies, "Understanding Digital Subscriber Line Technology", 1999, pp. 297-354.

D. Godard, IEEE Transaction Communications, vol. COM-28, No. 11, Nov. 1980, "Self-Recovering Equalization and Carrier Tracking in Two-Dimensional Data Communication Systems", pp. 1867-1875.

Lennart Ljung, PTR Prentice Hall Information and System Sciences Series, "System Identification, Theory for the User", Second Edition, 1999, pp. 79-139, 197-279, 317-360.

Raúl A. Casas et al., Broadcasting & Cable,"Current Approaches to Blind Decision Feedback Equalization", Aug. 1999, pp. 1-52.

John G. Proakis, McGraw Hill Series in Electrical and Computer Engineering, Digital Communications, Third Edition, 1995, pp. 267-286.

Craig Michael Teuscher, Dissertation submitted as requirement for the degree of Dr. of Philosophy in Engineering-Electrical Engineering and Computer Sciences, Low Power Receiver Design for Portable RF Applications: Design and Implementation of an Adaptive Multiuser Detector for an Indoor, Wideband CDMA Application, Fall 1998, pp. 37, 43-52.

Claes Tidestav et al., Signals and Systems, Uppsala University, "Realizable MIMO Decision Feedback Equalizers", International Conference on Acoustics, Speech, and Signal Processing (ICASSP99) Mar. 1999, Phoenix, AZ, V.5, pp. 2591-2594.

K. Sam Shanmugan et al., John Wiley & Sons, "Random Signals, Detection, Estimation, and Data Analysis", 1988, pp. 341-377.

Harry L. Van Trees, Massachusetts Institute of Technology, "Detection, Estimation, and Modulation Theory", 1968, pp. 19-163, 239-418.

International Search Report, PCT/US00/30967, Nov. 10, 2000.

Petersen, et al., "Minimum Mean Square Equalization in Cyclostationary and Stationary Interference-Analysis and Subscriber Line Calculations", Student Member, IEEE, vol. 9, No. 6, Aug. 1991, 11 pages.

Valenti, "Cable Crosstalk Parameters and Models", ANSI Contribution T1E1.4/97-302 Technical Subcommittee Working Group Members, Sep. 22, 1997, 8 pages.

Ljung, "System Identification:Theory for the User", Prentice-Hall, 1987, including Contents, 10 pages.

Boyd, et al., "Course Reader for EE364: Introduction to Convex Optimization with Engineering Applications", Stanford University Winter 1996-1997, 150 pages.

* cited by examiner

METHOD AND APPARATUS FOR THE PREDICTION AND OPTIMIZATION IN IMPAIRED COMMUNICATION SYSTEMS

This application claims the benefit of the filing date of the following Provisional U.S. Patent Applications:

"SPECTRAL MANAGEMENT AND OPTIMIZATION THROUGH ACCURATE IDENTIFICATION OF CROSSTALK CHANNELS AND UNCERTAINTY", application No. 60/164,986, filed Nov. 11, 1999;

"SPECTRAL MANAGEMENT AND OPTIMIZATION THROUGH ACCURATE IDENTIFICATION OF CROSSTALK CHANNELS AND UNCERTAINTY", application No. 60/181,125, filed on Feb. 8, 2000;

"SPECTRAL MANAGEMENT AND OPTIMIZATION THROUGH ACCURATE IDENTIFICATION OF CROSSTALK CHANNELS AND UNCERTAINTY", application No. 60/183,675, filed on Feb. 18, 2000; and "USE OF UNCERTAINTY IN PHYSICAL LAYER SIGNAL PROCESSING IN COMMUNICATIONS", application No. 60/165,399, filed Nov. 11, 1999.

FIELD OF THE INVENTION

The present invention relates generally to communications systems and, more particularly, to a method and an apparatus for the prediction and optimization of a communications system.

BACKGROUND OF THE INVENTION

In the communications arena one of the biggest challenges is to overcome crosstalk, noise, and other disturbances that interfere with signals. Whether the signals are transmitted over wires, cable, fiber optics, wireless, or other types of communications the signals suffer from some level of interference.

Interference in the signal may lead to certain limitations of the communication system. For example in wireless systems, such as cellular phones, interference may shorten the distance at which the signal can reliably be received and degrade the clarity of the signal. As another example, in wire systems, such as digital subscriber lines (DSL), interference may shorten the distance at which the signal can reliably be received, i.e., limit loop reach. Interference may also decrease the bit rate of the data being transferred. Providers of telecommunications services recognize the need to monitor the quality of service provided to users of their networks and to identify the causes of problems reported by their customers. This task, however, is complicated significantly by several factors.

Some of these factors include: the large number of networks, users, the large amount of data collected from the deployed lines, and the presence of competing providers in the same physical line plant. The coexistence of ILECs (Incumbent Local Exchange Carriers) and CLECs (Competitive Local Exchange Carriers) in the same cable binders, brought about by the federally mandated deregulation of local telecommunications markets, implies that services deployed by one carrier may be disturbing the users of another carrier, who has no information about the source of this disturbance.

It is thus highly desirable to sort through the collected data and determine whether a specific line is being disturbed by external impairment sources, such as AM radio, power ingress noise, temperature effects, and/or an internal interference such as another DSL service, and whether that offending service belongs to the same carrier or not. Unfortunately, with today's deployed monitoring technology, carriers are extremely limited in their ability to perform such diagnosis with adequate accuracy and reliability.

The following discussion outlines in detail many of the problems of digital subscriber line (DSL) technology and potential solutions thereto. However the discussion merely uses DSL as one example of many communications systems (e.g. wireline, wireless, optical, cable, etc.) in which the present invention may be used. Thus the present invention should not be limited to merely DSL communications systems.

In DSL communication systems, there are current methods of pre-qualification for the deployment of DSL service. When a customer inquires about availability of the DSL service, the provider uses the following methods in determining whether to deploy the candidate line: (1) distance from the central office (CO); (2) Manhattan distance from the CO using street maps; and (3) use a database of deployed gauges and lengths for a candidate line. The Manhattan distance is the distance measured from the customer premise equipment (CPE) to the CO by following a number of streets instead of measuring the direct distance between the CPE and CO. These methods involve the estimation of signal attenuation by the line, but do not involve estimating the effects of cross-talk on the candidate line and surrounding lines.

There are also current methods of testing and debugging installation. Upon installation, if the candidate line does not support the service due to cross-talk from radio transmission (AM) interference, the diagnosis of such problems involves dispatching a technician with a spectrum analyzer in the field. This process may take a number of days to complete. Alternate lines, if available, are tried instead in order to find a less impaired line. A candidate line can also become impaired after successful installation due to cross-talk from a newly provisioned line in the same binder. This may not be accounted for when installing the candidate line.

In addition, current methods of deployment planning use conservative bounds on cross-talk transfer functions, also know as Unger Mask, to determine when cross-talk may lead to problems. However, not all providers agree with the conservatism inherent in this method. Therefore, individual providers sometimes deploy services based on less conservative bounds. The degree of conservatism is different among providers. Ongoing Spectral Management standards activities may provide guidelines for future regulations.

In the case of communications systems, it is desirable to accurately diagnose interference on the signals of any communications system. A solution is needed that enables a provider of a communications system to accurately diagnose and manage the interference on a particular communications system.

In the case of DSL systems, there is no existing way to provide local exchange carriers (LECs) with accurate information on crosstalk interference in an efficient manner. It is desirable to have a solution that allows LECs to recover lost performance, improve deployment and provide better diagnostics by knowing any number of the following: (1) where the crosstalk interference is coming from; (2) how bad the interference is; (3) when the interference will happen; (4) if starting a new line will disrupt the operation of existing lines; (5) how to reduce interference other than by restricting access to DSL; and (6) what went wrong when a DSL line goes down.

It is desirable to have a solution to predict and possibly optimize the performance of one or more channels of a communications system. Particularly for DSL, what is needed is a solution to predict and possibly optimize the performance of each service line in question without having to deploy that line until the parameters of that service have been found to be feasible and/or optimal using other means besides deployment.

SUMMARY OF THE INVENTION

A method and an apparatus are disclosed for the prediction and optimization of the performance of a communications system. The present invention provides for the prediction and optimization of the performance of a communications system comprising the steps of inputting a plurality of channels, predicting a performance of each channel using a plurality of parameters to characterize the performance of the channel, and possibly optimizing the parameters of each channel according to one or more design criteria.

BRIEF DESCRIPTION OF THE DRAWINGS

The present invention is illustrated by way of example and not limitation in the figures of the accompanying drawings.

DETAILED DESCRIPTION

Figure 1:
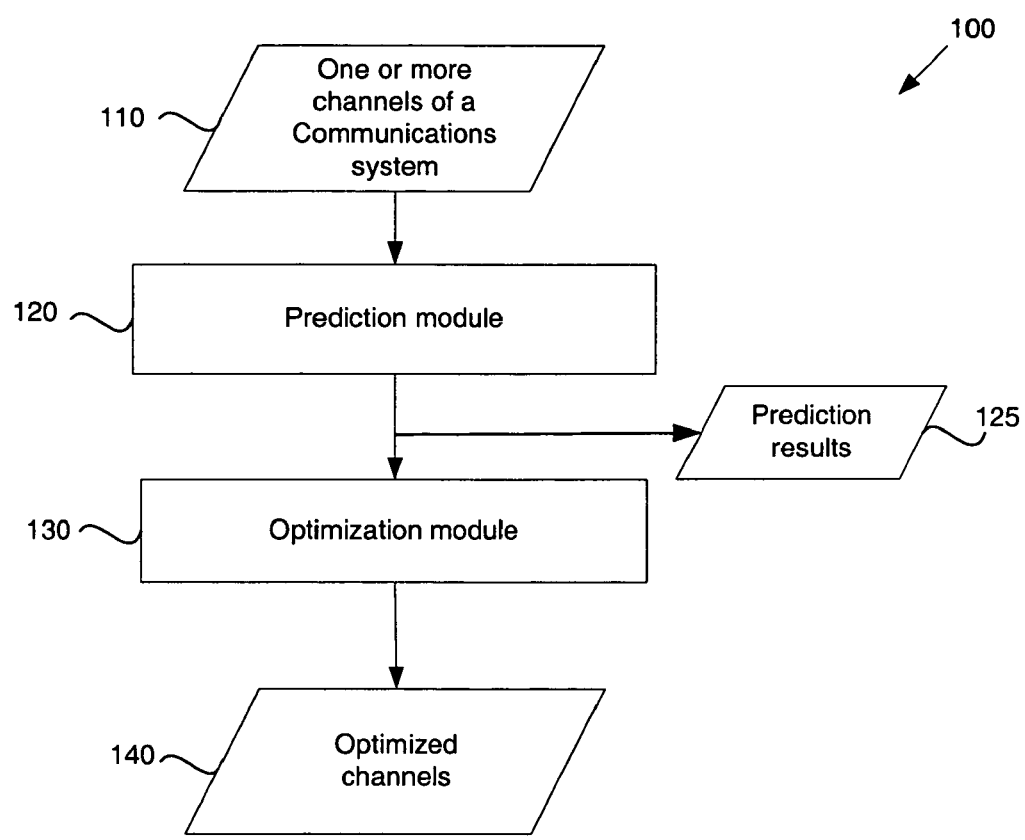
FIG. 1 shows a flowchart of a prediction and optimization system for a communications system.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

I. OVERVIEW OF GENERAL COMMUNICATION NETWORK

Figure 11:
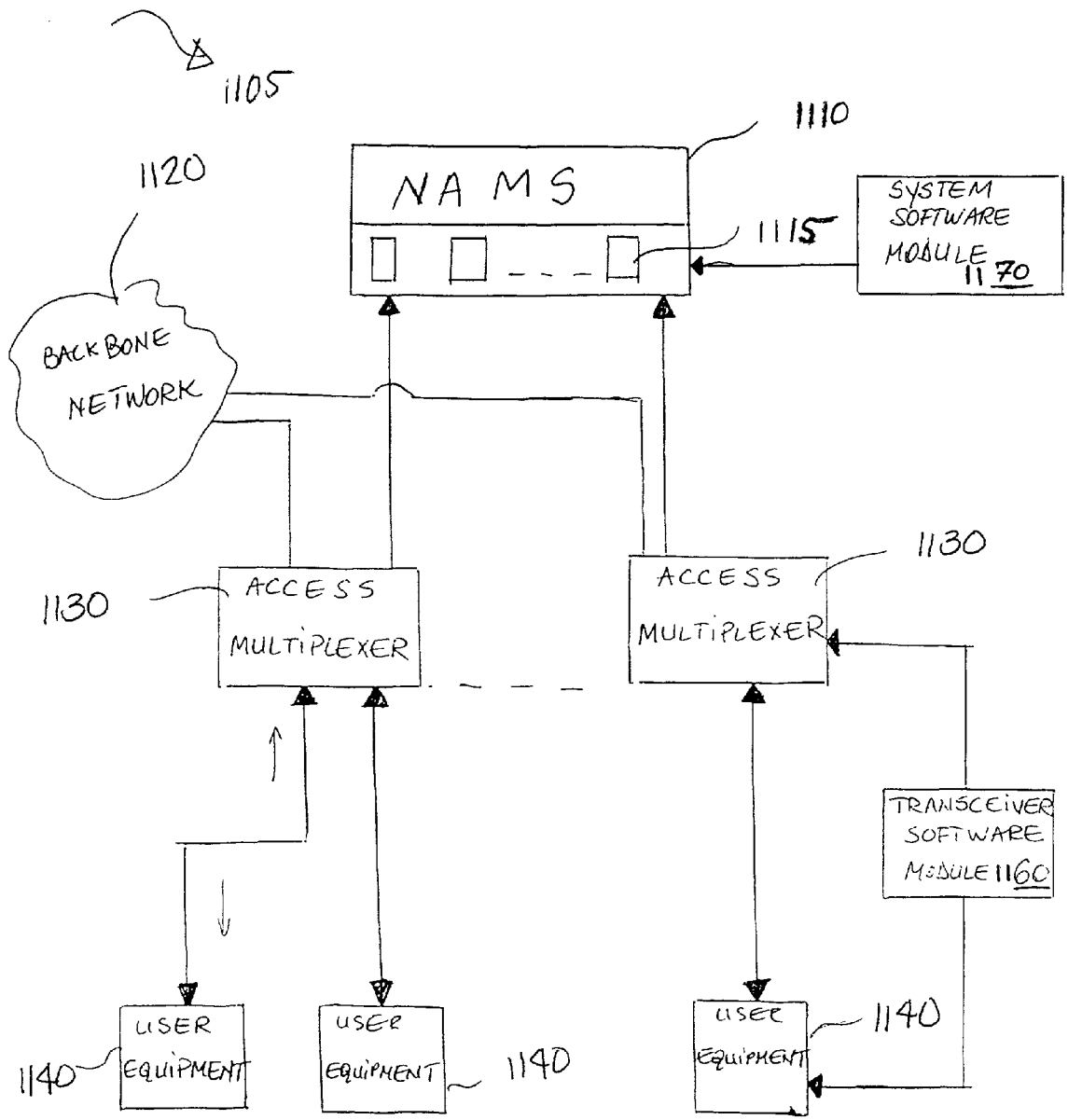
FIG. 11 shows an exemplary communication system.

The present invention is applicable to a variety of communication systems, for example: wireline, wireless, cable, and optical. FIG. 11 illustrates an exemplary communication system 1105 that may benefit from the present invention. The backbone network 1120 is generally accessed by a user through a multitude of access multiplexers 1130 such as: base stations, DSLAMs (DSL Access Mulitplexers), or switchboards. The access multiplexers 1130 communicate management data with a Network Access Management System (NAMS) 1110. The NAMS 1110 includes several management agents 1115 which are responsible for monitoring traffic patterns, transmission lines status, etc. Further, the access multiplexers 1130 communicate with the network users. The user equipment 1140 exchanges user information, such as user data and management data, with the access multiplexer 1130 in a downstream and upstream fashion. The upstream data transmission is initiated at the user equipment 1140 such that the user data is transmitted from the user equipment 1140 to the access multiplexer 1130. Conversely, the downstream data is transmitted from the access multiplexer 1130 to the user equipment 1140. User equipment 1140 may consist of various types of receivers that contain modems such as: cable modems, DSL modems, and wireless modems.

The invention described herein provides a method and system for managing the upstream and downstream data in a communication system. As such, the present invention provides management agents that may be implemented in the NAMS 1110, the access multiplexers 1130, and/or the user equipment 1140. One example of such a management agent is a system software module 1170 that may be embedded in the NAMS 1110. Another management agent that manages the data in the communication system 1105 is a transceiver software module 1160 that may be embedded in the access multiplexer 1130 and/or the user equipment 1140. Further details of the operation of modules 1170 and 1160 are described below.

Figure 12:
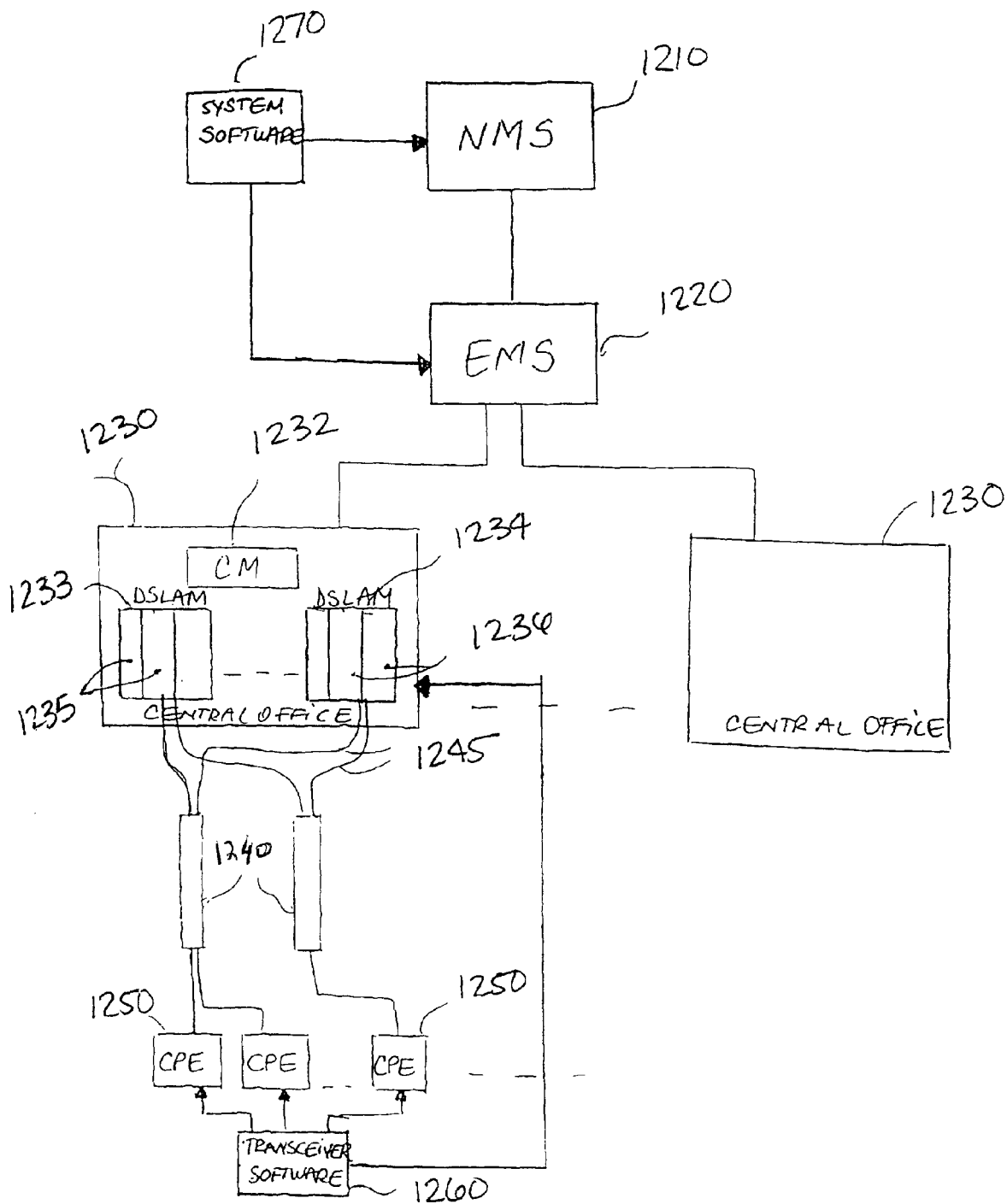
FIG. 12 show the present invention as software.

For illustration purposes and in order not to obscure the present invention, an example of a communication system that may implement the present invention is a DSL communication system. As such, the following discussion, including FIG. 12, is useful to provide a general overview of the present invention and how the invention interacts with the architecture of the DSL system.

Overview of DSL Example

The present invention may be implemented in software modules or hardware that DSL equipment manufacturers may then embed in their hardware. Thus, although FIG. 12 illustrates the present invention as software, the present invention should not be limited thereto. It should also be noted that this patent application may only describe a portion or portions of the entire inventive system and that other portions are described in co-pending patent applications filed on even date herewith.

FIG. 1230 illustrates an exemplary embodiment of the present invention as implemented in a DSL system. The DSL system consists of a network of components starting from the Network Management System (NMS) 1210 all the way down to the Customer Premise Equipment (CPE) 1250. The following is a brief description of how these components are interconnected.

The Network Management System (NMS) 1210 is a very high level component that monitors and controls various aspects of the DSL system through an Element Management System (EMS) 1220. The NMS 1210 may be connected to several Central Offices (CO) 3030 through any number of EMSs 1220. The EMS 3020 effectively distributes the control information from the NMS 1210 to the DSL Access Multiplexers (DSLAMs) 1233 and forwards to the NMS 1210 network performance or network status indicia from the DSLAMs 1233. DSLAMs 1233 reside in a Central Office (CO) 1230, usually of a telecommunications company. Alternatively, DSLAMs 1233 may reside in remote enclosures called Digital Loop Carriers (DLC). The CO 1230 may have tens or hundreds of DSLAMs 1233 and control modules (CM) 1232. A DSLAM 1233 operates as a distributor of DSL service and includes line cards 1235 and 1236 that contain CO modems. The CO modems are connected to at least one line 1245, but more frequently it contains several line cards 1235 and 1236 that are connected to several lines 1245. Usually the lines 1245 are traditional phone lines that consist of twisted wire pairs and there may be multiple lines 1245 in a binder 1240 and multiple binders in a cable. The transmission cables act as packaging and protection for the lines 1245 until the lines 1245 reach the Customer Premise Equipment (CPE) 1250. It should be noted that a DSLAM 1235 does not necessarily have to be connected to lines 1245 in a single binder 1240 and may be connected to lines in multiple binders 1240. The lines 1245 terminate at the CPE 1250 in transceivers that include CPE modems. The CPE 1250 may be part of or connected to residential equipment, for example a personal computer, and/or business equipment, for example a computer system network.

As discussed in the background section, communications systems often suffer from interference and/or impairments such as crosstalk, AM radio, power ingress noise, thermal variations, and/or other "noise" disturbers. The present invention or portions of the present invention provide the user the capability to analyze, diagnose and/or compensate for these interferences and/or impairments. It also provides the ability to predict and optimize performance of the communication system in the face of impairments.

As illustrated in FIG. 12, the transceiver software 1260, depending upon how implemented, may provide the user with the ability to analyze, diagnose, and compensate for the interference and/or impairment patterns that may affect their line.

Also as illustrated in FIG. 12, the system software of the present invention 1270, depending upon how implemented, may provide the service provider with the ability to diagnose, analyze, and compensate for the interference and/or impairment patterns that may affect the service they are providing on a particular line. The diagnosis and analysis of the transceiver software also provide the ability to monitor other transmission lines that are not connected to the DSLAMs or NMS but share the same binders.

It should be noted that the system software of the present invention 1270 may be implemented in whole or in part on the NMS 1210 and/or EMS 1220 depending upon the preference of the particular service provider. Likewise, it should be noted that the transceiver software 1260 may be implemented in whole or in part on the DSLAM 1233 and/or transceivers of CPE 1250 depending upon the preference of the particular user. Thus, the particular implementation of the present invention may vary, and depending upon how implemented, may provide a variety of different benefits to the user and/or service provider.

It should also be noted that the system software of the present invention 1270 and the transceiver software 1260 may operate separately or may operate in conjunction with one another for improved benefits. As such, the transceiver software 1260 may provide diagnostic assistance to the system software of the present invention 1270. Additionally, the system software of the present invention 1270 may provide compensation assistance to the transceiver software 1260.

Thus, given the implementation of the present invention with respect to the DSL system example of FIG. 12, one of ordinary skill in the communications art would understand how the present invention may also be implemented in other communications systems, for example: wireline, wireless, cable, optical, and other communication systems. Further details of the present invention are provided below. Additional examples of how the present invention may be implemented in a DSL system are also provided below for illustrative purposes.

II. INTRODUCTION

The present invention provides for the prediction and optimization of a communications system. In the communications arena one of the biggest challenges is to overcome crosstalk, noise, and other disturbances that interfere with signals. Whether the signals are transmitted over wires, cable, fiber optics, wireless, or other types of communications systems, the signals suffer from some level of interference. Interference in the signal may lead to certain limitations of the communication system. The present invention provides for the prediction and optimization of a communications system so that this interference may be minimized and performance may be maximized without actual deployment of channels.

The present invention may be used in various communications systems such as wireless networks, cable, fiber optic networks, DSL systems, or other types of communications systems. The following discussion includes a detailed example of the present invention in conjunction with DSL systems. However the discussion merely uses DSL as one example of many communications systems (e.g. wireline, wireless, optical, cable, etc.) in which the present invention may be used. This is just one example and should not limit the scope of the present invention.

III. DEFINITIONS channel=a communication path;
disturber=a source of impairment, e.g. a line, an amplitude modulation (AM) radio station, a temperature variation, etc.;
binder=a grouping of twisted wire pairs;
event=change in line data that is deemed significant enough to be considered when diagnosing impairments.
in-domain=monitored by the detection and diagnosis system;
line=a type of channel characterized by a cable on which the information carrying signal travels (e.g. twisted pair for DSL)
out-of-domain=not monitored by the detection and diagnosis system
victim=a location where impairment with normal signal propagation is felt, e.g. a line;

IV. OVERVIEW OF PREDICTION AND OPTIMIZATION

FIG. 1 shows a flowchart of a prediction and optimization system 100 for a communications system. In step 110, one or more channels of a communications system is inputted into the prediction and optimization system 100. In one embodiment, a new channel may be inputted in order to find the optimum characterization for that new channel. In another embodiment, multiple channels may be inputted into the system 100.

In step 120, a prediction module predicts the performance of any given channel by providing a characterization of one or more parameters describing that channel. In one embodiment, prediction may involve looking at the performance of each channel. In another embodiment, prediction may involve looking at the performance of each channel as well as the effect of that channel on the entire communications system or adjacent channels. In step 125, the results of the prediction module may be used without further analysis by the optimization module. This is one embodiment. In another embodiment, the results of the prediction module are then used by the optimization module in step 130.

As seen in step 130, an optimization module finds the optimum characterization for each channel based on one or more decision criteria including but not limited to minimum cost of deployment, maximum signal to noise ratio (SNR), maximum total revenue, and maximum bit rate. Optimization may also be based on the combination of a few criteria through a cost function with different weighting functions on different criteria. After optimization is complete, the result is one or more optimized channels. This is seen in step 140.

Figure 2:
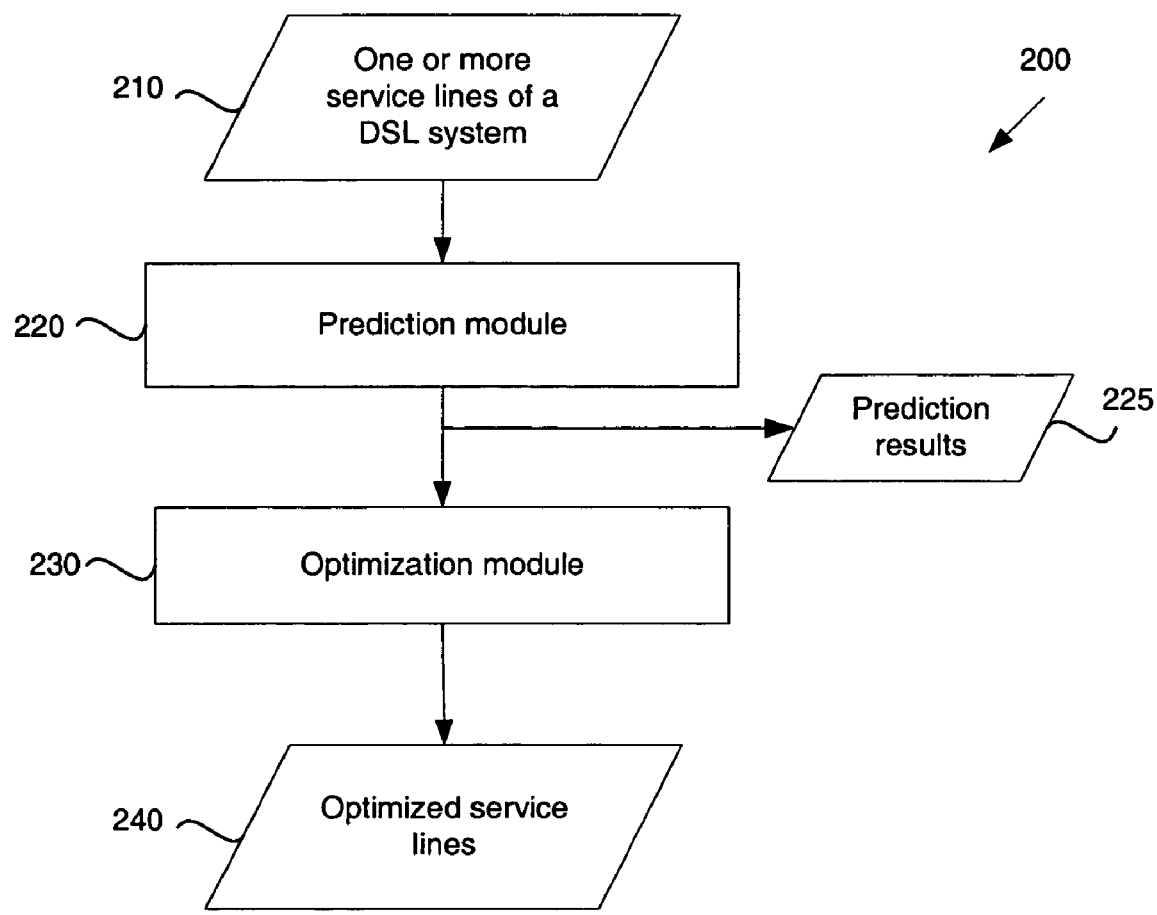
FIG. 2 shows a flowchart of a prediction and optimization system for a DSL system.

FIG. 2 shows a flowchart of a prediction and optimization system 200 for a DSL system. In step 210, one or more DSL service lines are inputted into the system 200. In step 220, a prediction module predicts the performance of new or existing service lines. This is one embodiment for step 220. In another embodiment, the prediction module may predict the performance of new or existing lines as well as the interference caused by these lines on other existing lines. This type of prediction enables service providers to predict the effect of future service lines on the existing DSL networks before the actual service lines are deployed. It also enables service providers to compare different effects of different service types so they are able to make a decision on what service type and/or bit rate for that service type is to be deployed for a new customer.

In step 225, the results of the prediction module may be used without further analysis by the optimization module. This is one embodiment. In another embodiment, the results of the prediction module are then used by the optimization module in step 230.

In step 230, an optimization module chooses optimum parameters for the deployment of new or existing service lines based on different decision criteria including but not limited to minimum cost of deployment, maximum signal to noise ratio (SNR), maximum total revenue, and maximum bit rate. Optimization may also be based on the combination of a few criteria through a cost function with different weighting functions on different criteria. After optimization is complete, the result is one or more optimized DSL lines. This is seen in step 240.

V. PREDICTION

A. New Channel Performance Prediction

Figure 3:
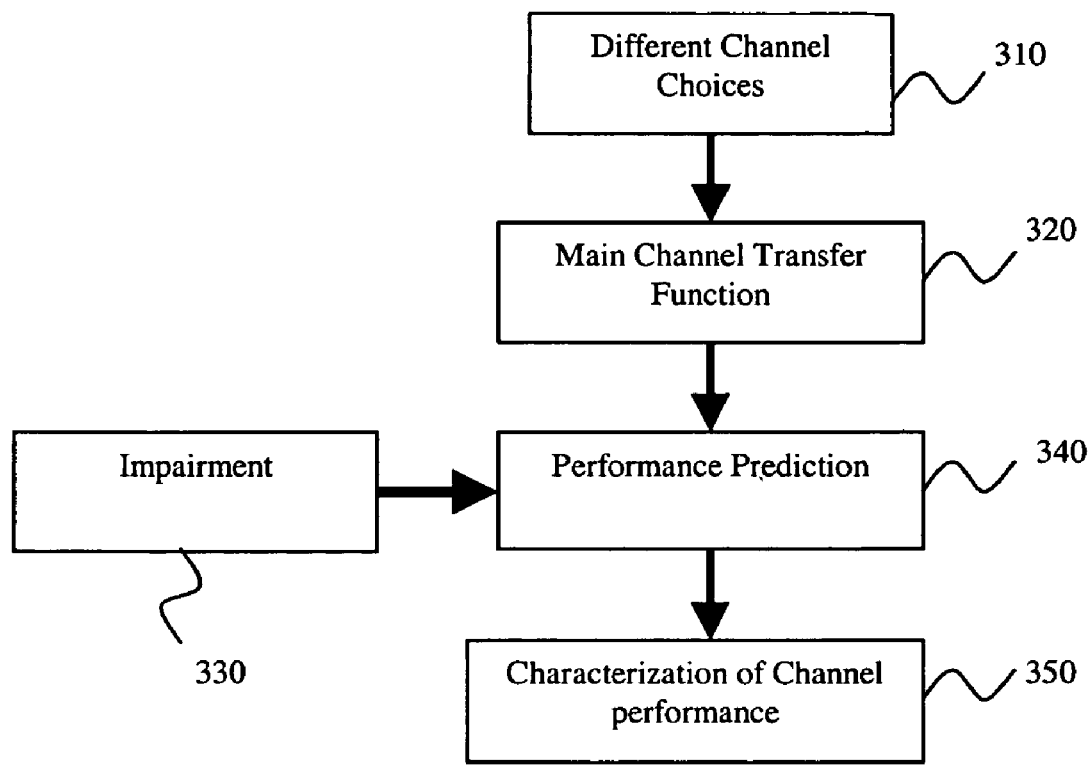
FIG. 3 shows an embodiment of a process for the prediction of the performance for a communications system.

FIG. 3 shows an embodiment of a process for the prediction of the performance for a communications system. In step 310, one or more channels may be inputted into a prediction module. In an alternative embodiment where the communications system is a DSL system, any number of different service types for the new service line may be chosen and inputted into a prediction module.

In step 320, a main channel transfer function is obtained. In one embodiment, a simulator may create transfer function models of channels using physical configuration information. In an alternative embodiment, a spectrum management system can use an identification and characterization process to find the transfer functions from the inputs and outputs of a given system. This information is fed to the simulator. For an example of an identification and characterization process performed by a spectrum management system, see co-pending application titled "Methods and Apparatus for Impairment Diagnosis in Communication Systems" by John Josef Hench, Thorkell Gudmundsson, Amir Gholamhossein Zadeh Aghdam, Ioannis Kanellakopoulos, Gurcan Aral, Yaolong Tan, Harbinder Singh and Sunil C. Shah, assigned to the assignee herein and filed on Nov. 10, 2000 herewith. In an alternative embodiment, a service provider may measure the channel transfer function.

In step 330, impairment is used to predict the performance of the communications system. In one embodiment, impairment may be cross-talk transfer functions in DSL systems. These cross-talk transfer functions may be computed by a spectrum management system that can use an identification and characterization process to find the transfer functions from the inputs and outputs of a given system. This information is fed to the simulator. For an example of the identification and characterization process, see above mentioned co-pending application titled "Methods and Apparatus for Impairment Diagnosis in Communication Systems" by John Josef Hench, Thorkell Gudmundsson, Amir Gholamhossein Zadeh Aghdam, Ioannis Kanellakopoulos, Gurcan Aral, Yaolong Tan, Harbinder Singh and Sunil C. Shah, assigned to the assignee herein and filed on Nov. 10, 2000 herewith.

In an alternative embodiment, impairment may be AM interference and is taken into account when predicting the performance of a DSL system. Information from a local AM station may be used to predict the effect of the AM stations on a new service line. For example, AM radio station 910 (frequency 910 kHz) will affect the deployment of a digital multi-tone asymmetric digital subscriber line (DMT ADSL) since a DMT ADSL uses the transmit frequency from 138 kHz to 1.104 MHz for the downstream data. However, it won't affect symmetric digital subscriber line (SDSL) with 784 kbps because that service transmits most of its energy in frequencies up to 392 kHz. In another embodiment, the effect of temperature on loop attenuation may also be taken into account in predicting the performance of a DSL system.

In step 340, a simulator takes a received signal computed from the channel transfer function and the impairment and calculates the data that is used to characterize the performance of the channel. This characterization may be done using such data as SNR, loop attenutation (ATN), and/or maximum attainable bit rate. The characterization of the channel is done in step 350.

B. Existing Channel Performance Degradation Prediction

Figure 4:
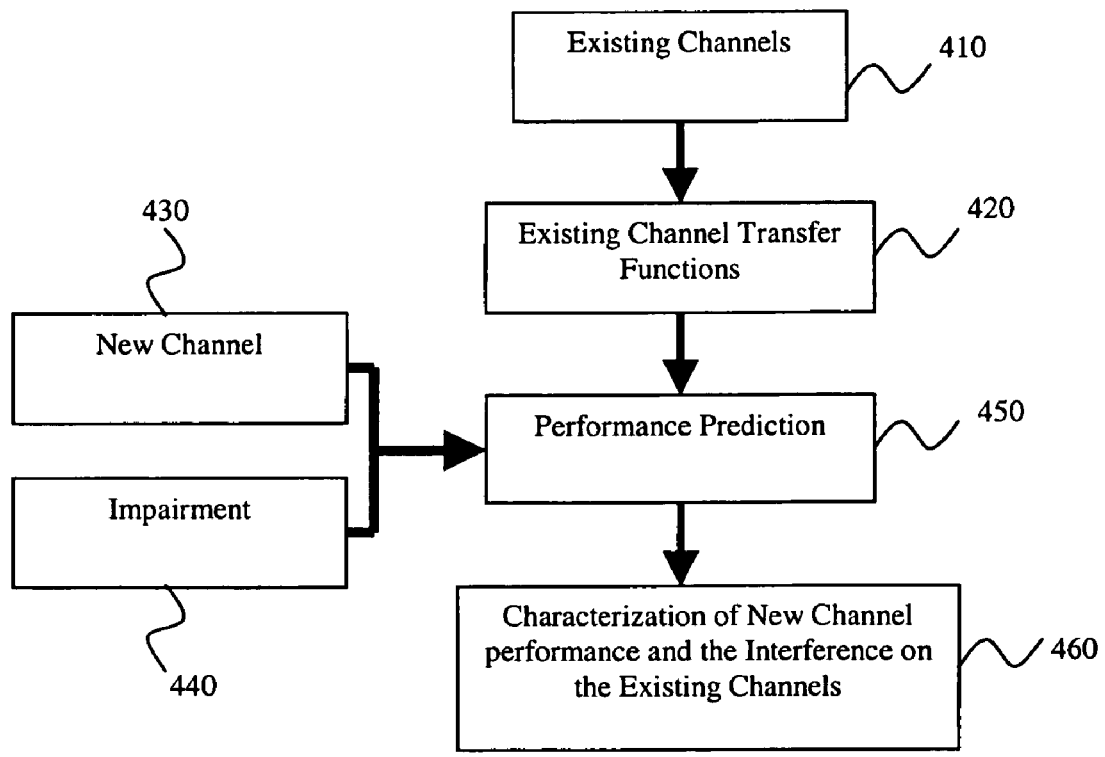
FIG. 4 shows an embodiment of a process for the prediction of the performance for a DSL system.

FIG. 4 shows an alternative embodiment of a process for the prediction of the performance for a communications system. This embodiment includes the degradation of existing channels from a new channel. In step 410, one or more existing channels may be inputted into a prediction module. In an alternative embodiment where the communications system is a DSL system, any number of different service types for existing service lines may be chosen and inputted into a prediction module.

In step 420, existing channel transfer functions are obtained. In one embodiment, a simulator may create transfer function models of channels using physical configuration information. In an alternative embodiment, a spectrum management system can use an identification and characterization process to find the transfer functions from the inputs and outputs of a given system. This information is fed to the simulator. For an example of a spectrum management system, see co-pending application titled "Methods and Apparatus for Impairment Diagnosis in Communication Systems" by John Josef Hench, Thorkell Gudmundsson, Amir Gholamhossein Zadeh Aghdam, Ioannis Kanellakopoulos, Gurcan Aral, Yaolong Tan, Harbinder Singh and Sunil C. Shah, assigned to the assignee herein and filed on Nov. 10, 2000 herewith. In an alternative embodiment, a service provider may measure the channel transfer function.

In step 430, a new channel transfer function is obtained. The new channel transfer function may be obtained in any of the ways mentioned above for existing channel transfer functions. In step 440, impairment is used to predict the performance of the communications system. In one embodiment, impairment may be cross-talk transfer functions in DSL systems. These cross-talk transfer functions may be computed a spectrum management system that can use an identification and characterization process to find the transfer functions from the inputs and outputs of a given system. This information is fed to the simulator. For an example of the identification and characterization process, see above mentioned co-pending application titled "Methods and Apparatus for Impairment Diagnosis in Communication Systems" by John Josef Hench, Thorkell Gudmundsson, Amir Gholamhossein Zadeh Aghdam, Ioannis Kanellakopoulos, Gurcan Aral, Yaolong Tan, Harbinder Singh and Sunil C. Shah, assigned to the assignee herein and filed on Nov. 10, 2000 herewith.

In an alternative embodiment, impairment may be AM interference and is taken into account when predicting the performance of a DSL system. Information from a local AM station may be used to predict the effect of the AM stations on a new service line. For example, AM radio station 910 (frequency 910 kHz) will affect the deployment of a digital multi-tone asymmetric digital subscriber line (DMT ADSL) since a DMT ADSL uses the transmit frequency from 138 kHz to 1.104 MHz for the downstream data. However, it won't affect symmetric digital subscriber line (SDSL) with 784 kbps because that service transmits most of its energy in frequencies up to 392 kHz. In another embodiment, the effect of temperature on loop attenuation may also be taken into account in predicting the performance of a DSL system.

In step 450, a simulator takes received signals computed from the existing channel transfer functions, the new channel transfer function, and the impairment and calculates the data that is used to characterize the performance of the new channel and the performance degradation of the existing channels. The characterization for the new channel may be done using such data as SNR, loop attenuation (ATN), and/or maximum attainable bit rate. The performance degradation of existing channels may be characterized by such data as SNR drop and/or minimum attainable bit rate drop. The characterization of the new channel as well as the characterization of the existing channels is done in step 460.

VI. OPTIMIZATION

Optimization involves finding an optimum configuration for a communications system based on one or more of a number of decision variables. In one embodiment, these decision variables can be service type and bit rate for DSL systems. Then, numerical optimization may be done using the decision variables and cost functions, e.g. weighted sum of gross profit stream, revenue stream, or total bit rates. There are many constraints factored into this scenario such as transfer functions and uncertainties, pricing as a function of service level and service types, spectral management rules mandated by regulatory bodies, and customer types such as residential, home office, small business, etc. . . . .

Numerical optimization may be re-formulated by changing the parameters or constraints so that one solves a Convex program. Methods of re-formulating and solving Convex programs are described in "Convex Optimization" by Stephen Boyd and Lieven Vandenberghe in Course Reader for EE364: Introduction to Convex Optimization with Engineering Application, Stanford University, 1996-1997.

A. Line Performance Optimization

1. Communications System

Figure 5:
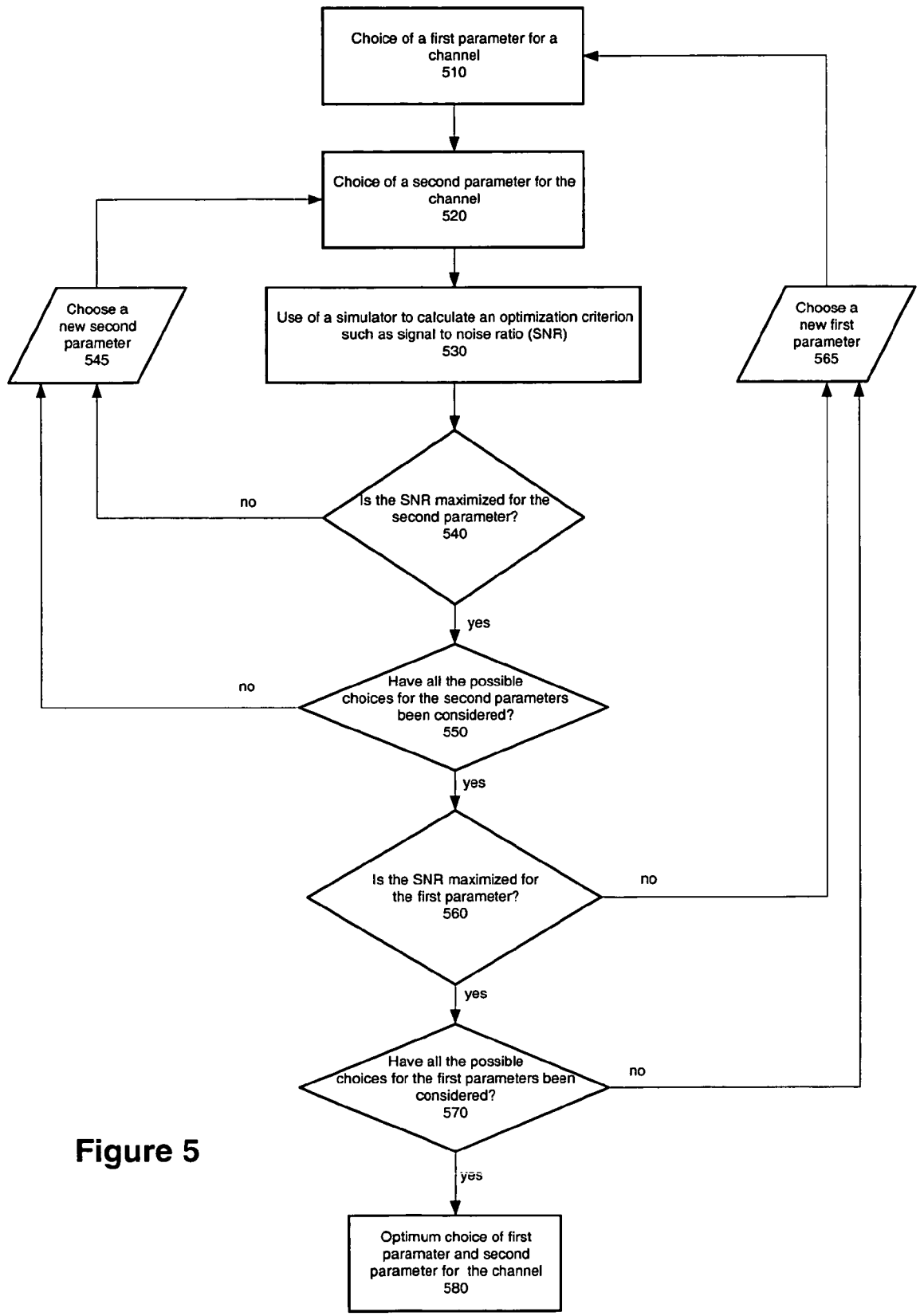
FIG. 5 shows an embodiment of a process of the optimization of the performance for a communications system.

FIG. 5 shows an embodiment of a process of the optimization of the performance for a communications system. In this embodiment, an optimization module of a spectrum management system optimizes the deployment of one or more channels of a communications system based on different decision criteria. In this embodiment, consideration is not given to any degrading effects of one or more new channels on any existing channels.

For communications systems, there are many factors that could be taken into account when trying to optimize each new channel. FIG. 5 is one embodiment where the optimization process uses two parameters. Other embodiments may use one or more parameters in this process.

In step 510 of FIG. 5, a choice for a first parameter is made. Then a choice for a second parameter is made in step 520. A simulator uses these two chosen parameters to calculate an optimization criteria for the channel. The optimization criteria can be based on many decision criteria as mentioned before. The optimization criteria for this embodiment is SNR. SNR is calculated for the parameters chosen for a particular channel in step 530.

In step 540, it is determined if the SNR is maximized for the second parameter. If it is not, the process moves to step 545 where a new choice for the second parameter is made and used to calculate SNR for the channel. If SNR is maximized for the second parameter, the optimization module determines if all possible choices for the second parameter have been considered. This is done in step 550. Again, if there is at least one choice of a second parameter that has not been used to calculate SNR, then the process is repeated. If all possible choices have been run through the process, the next step is step 560.

In step 560, it is determined if the SNR is maximized for the first parameter. If it is not, the process moves to step 565 where a new choice for the first parameter is made and used to calculate SNR for the channel. If the SNR is maximized for the first parameter, the optimization module determines if all possible choices for the first parameter have been considered. This is done in step 570. Again, if there is at least one choice of a first parameter that has not been used to calculate SNR, then the process is repeated. If all possible choices have been run through the process, optimization of the channel is complete. The end result is optimal channel performance obtained with specific values of the first and second parameters.

2. DSL System

Figure 6:
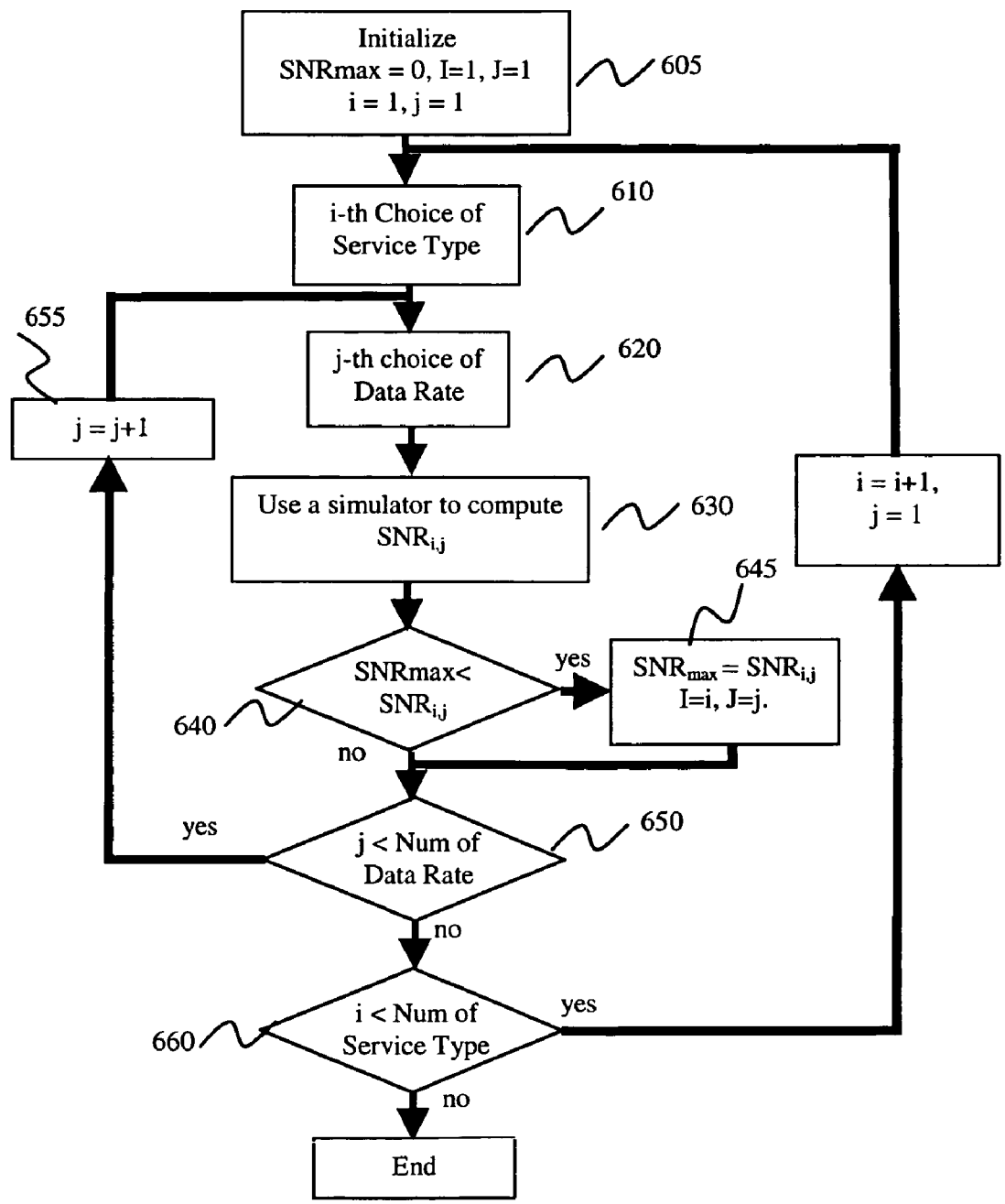
FIG. 6 shows an embodiment of a process of the optimization of the performance for a DSL system.

FIG. 6 shows an embodiment of a process of the optimization of performance for a DSL system. This embodiment illustrates how an optimization module of a spectrum management system optimizes the deployment of one or more new service lines of a DSL system based on different decision criteria. In this embodiment, consideration is not given to any degrading effects of one or more new service lines on other existing service lines.

This embodiment is specific to a DSL system. As seen in FIG. 5, an optimization module can also be used to optimize one or more channels of any communications system. Optimization is not limited to DSL systems.

In this embodiment, when a new service line is to be deployed, there are many factors to be optimized. One factor is what service type the line should be deployed as. Another factor is what bit rate the new service line should be deployed at. This may be a simple optimization that can be carried out on the new service line.

In step 605 of FIG. 6, the process begins by setting the value of the variables as follows: $SNR_{max}$ equal to 0, 1 equal to 1, J equal to 1, i equal to 1, and j equal to 1. The choice of service type is represented by 'i' and the choice of bit rate is represented by 'j'.

In step 610, a service type is chosen. In one embodiment, the service type may be chosen by a service provider. Since only limited service types exist now, and, for each service type, only limited options of the bit rate can be deployed, the individual line performance optimization is finite dimensional. The optimization can be based on many decision criteria as mentioned before. For example, SNR can be the criterion. In step 620, the bit rate j is chosen for the service type i.

In this embodiment, $SNR_{i,j}$ is the SNR that will be obtained if service type i with the bit rate option j is deployed. Then the optimization problem becomes maximizing $SNR_{i,j}$, i.e., $$\max_{i,j} SNR_{i,j}.$$

In step 630, a simulator simulates the new service line and the existing service lines in order to find the value of $SNR_{i,j}$. In step 640, if the $SNR_{i,j}$ is greater than $SNR_{max}$, the process moves to step 645 where $SNR_{i,j}$ is set to be $SNR_{max}$. If $SNR_{i,j}$ is found to be less than $SNR_{max}$, the process moves on to steps 640 and 645 where the bit rate is changed for that particular service type i, and the process is repeated from step 620 until $SNR_{i,j}$ is greater than $SNR_{max}$.

The process may run a number of times using different service types and repeating the steps as seen in steps 650 and 655. When the process ends, the new or existing service line is optimized according to SNR in this embodiment. In other embodiments, other criteria can be used for the individual line performance optimization. In this embodiment, the optimization module found the maximum bit rate while ensuring that the SNR was higher than some pre-defined limit.

B. Line Performance Optimization with Degradation Penalty

1. Communications System

Figure 7:
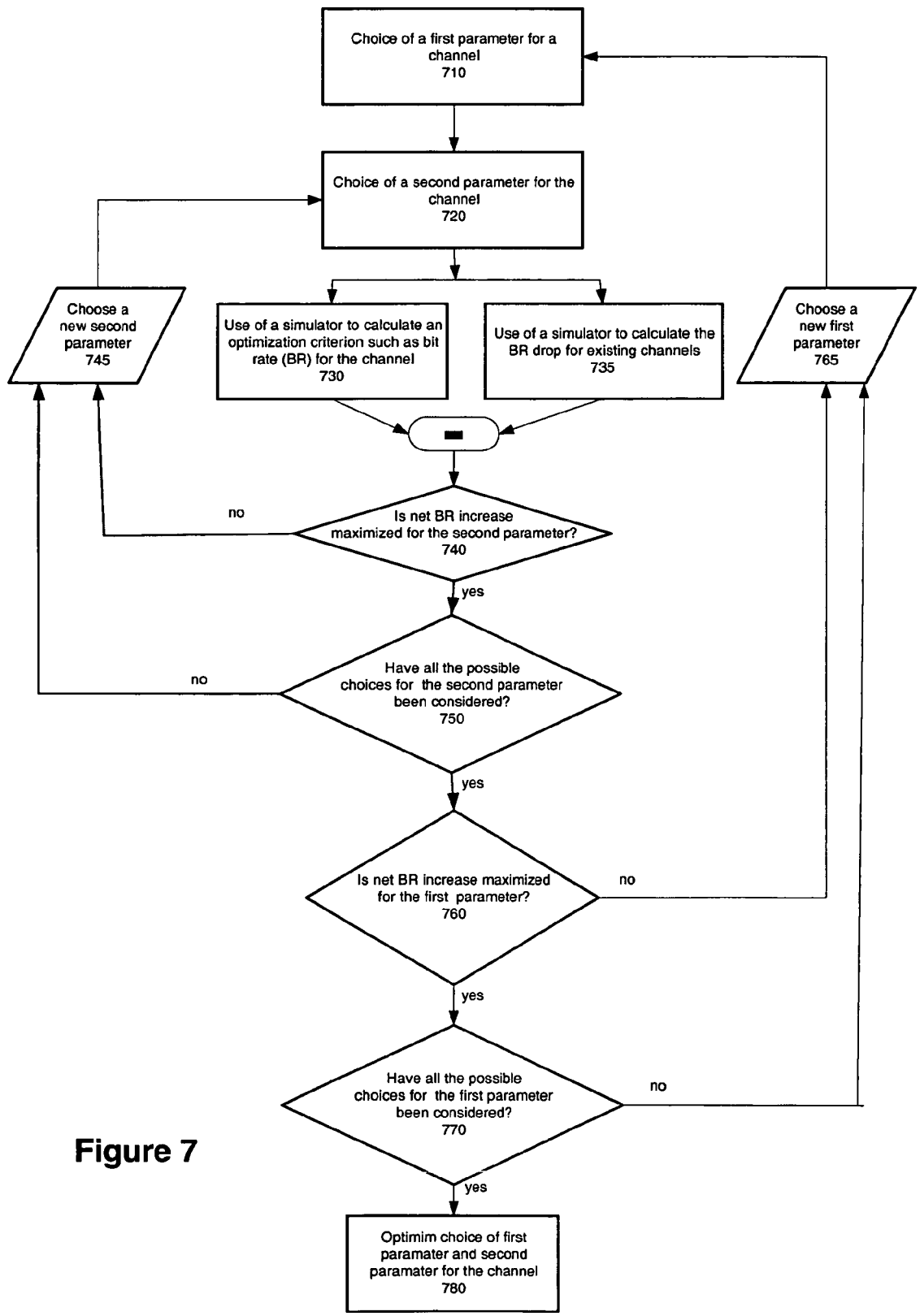
FIG. 7 shows an alternative embodiment of a process of the optimization of performance for a communications system.

FIG. 7 shows an alternative embodiment of a process of the optimization of performance for a communications system. This embodiment illustrates how an optimization module of a spectrum management system optimizes the deployment of one or more new channels in a communications system based on different design criteria. In this embodiment, consideration is also given to any degrading effect of one or more new channels on other existing channels.

While a new channel may be disturbed by other existing channels, the new channel may also disturb those other channels. This causes degradation on those other channels. In one embodiment, a goal may be to maximize the performance of a new channel while minimizing the interference of that new channel to the existing channels.

For communications systems, there are many factors that could be taken into account when trying to optimize each new channel. FIG. 7 is one embodiment where the optimization process uses two parameters. Other embodiments may use one or more parameters in this process.

In step 710 of FIG. 7, a choice for a first parameter of a channel is made. In step 720, a choice for a second parameter is made. A simulator calculates an optimization criteria for the new channel in step 730. In this embodiment, the optimization criteria is bit rate (BR). In step 735, the simulator calculates the BR drop for the existing channels caused by interference from the new channel. The BR drop is then subtracted from the BR to obtain the net BR increase.

In step 740, it is determined whether the net BR increase is maximized for the second parameter. If it is not, the process moves to step 745 where a new choice for the second parameter is made and used to calculate BR and BR drop. If net BR increase is maximized for the second parameter, the optimization module determines whether all possible choices for the second parameter have been considered. This is done in step 750. Again, if there is at least one choice of a second parameter that has not been used to calculate BR and BR drop, then the process is repeated. If all possible choices have been run through the process, the next step is step 760.

In step 760, it is determined if net BR increase is maximized for the first parameter. If it is not, the process moves to step 765 where a new choice for the first parameter is made and used to calculate BR and BR drop. If net BR increase is maximized for the first parameter, the optimization module determines if all possible choices for the first parameter have been considered. This is done in step 770. Again, if there is at least one choice of a first parameter that has not been used to calculate BR and BR drop, then the process is repeated. If all possible choices have been run through the process, optimization of the channel is complete. The end result is optimal channel performance achieved by specific values of the first and second parameters.

2. DSL System

Figure 8:
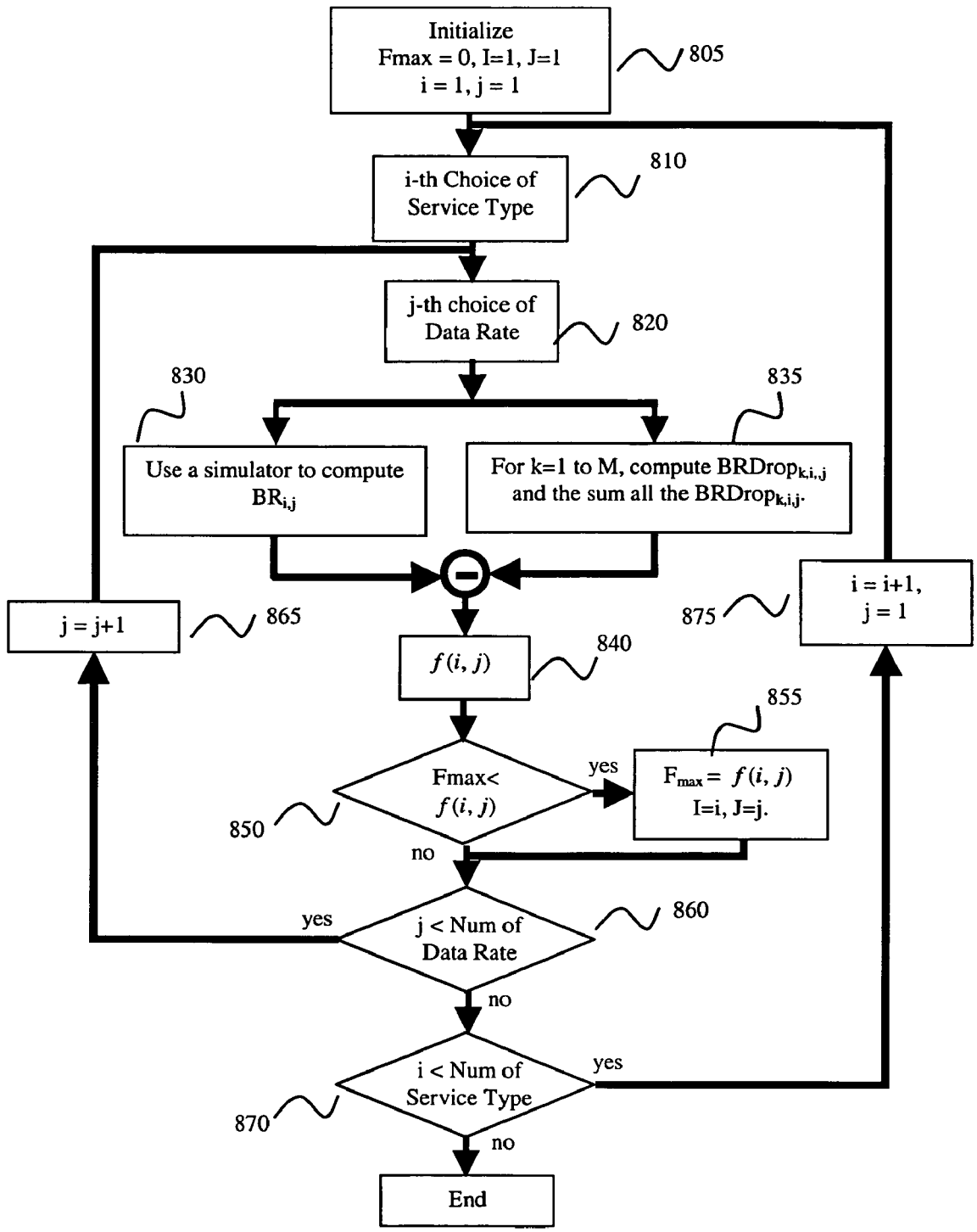
FIG. 8 shows an alternative embodiment of a process of the optimization of performance for a DSL system.

FIG. 8 shows an embodiment of a process of the optimization of performance for a DSL system. This embodiment illustrates how an optimization module of a spectrum management system optimizes the deployment of one or more new service lines in a DSL system based on different decision criteria. In this embodiment, consideration is also given to any degrading effect of one or more new service lines on other existing service lines.

While a new service line may be disturbed by other existing service lines, it also may affect other service lines. This causes degradation of other service lines. If all these service lines are owned by the same service provider, it is in the best interest of the provider to maximize the performance of the new service line while minimizing the interference to the existing service lines. Since it may not be able to achieve both at the same time, there is a tradeoff, which can be characterized as a cost function.

In step 805 of FIG. 8, the process is begun by setting the value of the variables as follows: $BR_{max}$ equal to 0, I equal to 1, J equal to 1, i equal to 1, and j equal to 1. The choice of service type is represented by 'i' and the choice of bit rate is represented by 'j'. The bit rate is represented by BR and BRDrop is representative of the bit rate drop.

In step 810, a service type i is chosen. In one embodiment, the service type may be chosen by a service provider. Since only limited service types exist now and for each service type and only limited options of the bit rate j can be deployed, the individual line performance optimization is finite dimensional. The optimization can be based on many decision criteria as mentioned before. In step 820, a bit rate j is chosen for the service type.

In step 830, a simulator simulates the new service line and the existing service lines in order to find the values of $BR_{i,j}$ for the new line and $BRDrop_{k,i,j}$ for each of the existing lines (k=1, ... M). The sum of all the $BRDrop_{k,i,j}$ is subtracted from the $BR_{i,j}$ in the same step to obtain a net BR increase. An optimization goal may be to maximize the net BR increase.

In step 840, the net BR increase is used as the optimization criteria in the following cost function:

$$\max_{i,j} f(i, j) = \max_{i,j} \left\{ BR_{i,j} - \sum_{k=1}^{M} BRDrop_{k,i,j} \right\},$$

where $BRDrop_{k,i,j}$, i=1, ..., M is the performance degradation of the k-th existing service line measured in terms of the bit rate, and i, j stand for the choice of the service type i and bit rate j for the new service line.

In step 850, if f(i,j) is greater than $F_{max}$, the process moves to step 855 where $F_{max}$ is set to be equal to f(i,j) and I=i and J=j. If f(i,j) is less than $F_{max}$, the process moves to steps 860 and 865 where the bit rate is changed for that particular service type i, and the process is repeated from step 820 until f(i,j) is greater than $F_{max}$.

The process may run a number of times using different service types and repeating the steps as seen in steps 870 and 875. When the process ends, the new or existing service line is optimized in this embodiment by maximizing the BR of the new line or existing line while minimizing the BRDrop in the other existing lines in this embodiment. In other embodiments, other criteria can be used for the individual line performance optimization.

C. Multiple Line Performance Optimization

Figure 9:
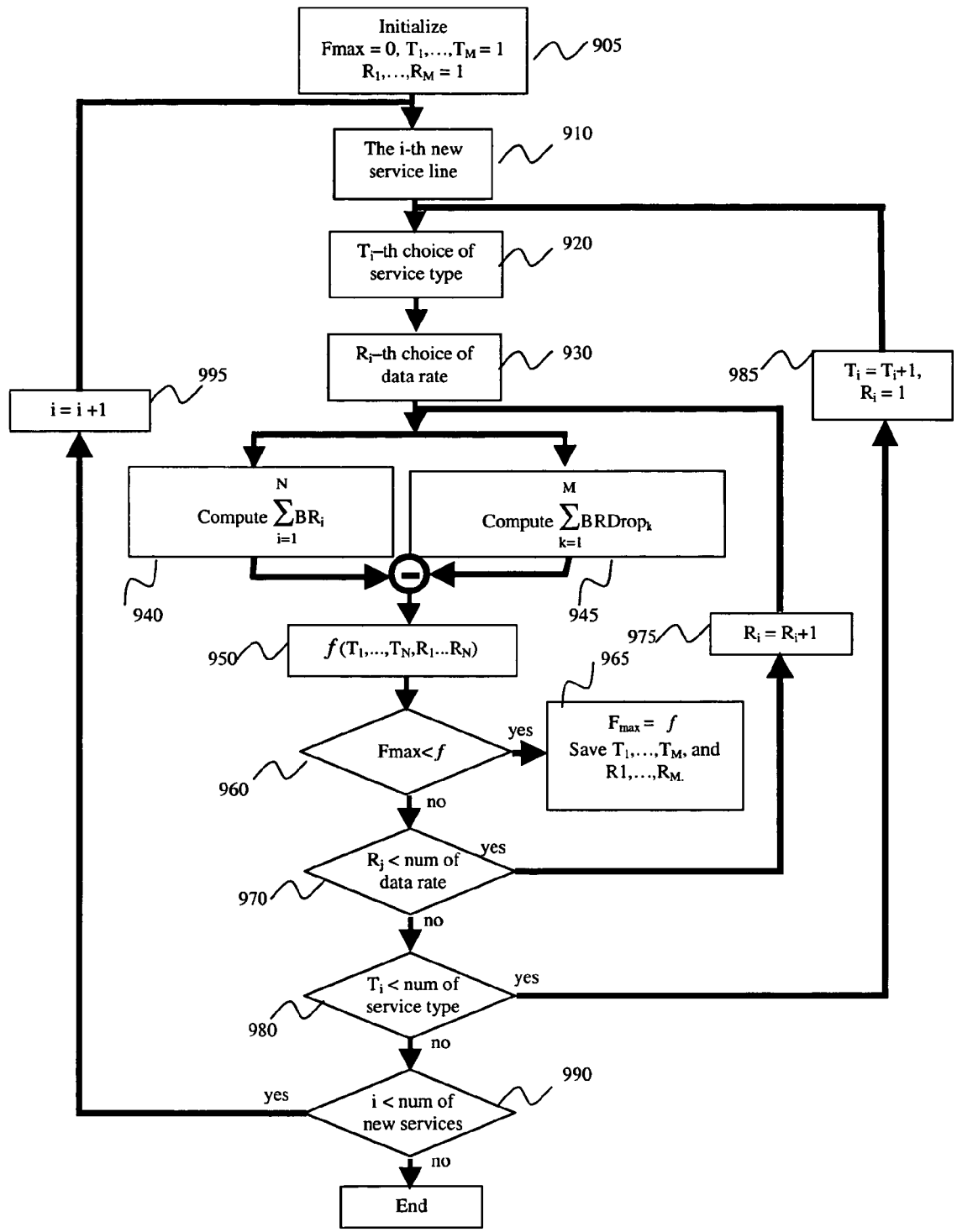
FIG. 9 shows another alternative embodiment of a process of the optimization of performance for a DSL system.

FIG. 9 shows an alternative embodiment of a process of the optimization of performance for a DSL system. This embodiment illustrates how an optimization module of a spectrum management system optimizes the deployment of multiple service lines in the same binder or in different binder based on different decision criteria. This embodiment is illustrative of lines in a DSL system. An optimization module may also optimize the deployment of multiple channels in a communications system based on different design criteria.

The crosstalk interference usually is only very strong between lines in the same binder. Because of the separation, there is much less crosstalk interference between binders.

Therefore, it makes sense to optimize the binder performance if deploying multiple service lines in the same binder and there is freedom to assign the service types and bit rates for these service lines. Also it is taken into consideration that some service lines in the binder have already assigned their service types and bit rate. Of course, the multiple line performance optimization is not necessary limited in the same binder and it can be based on multiple binders, which will inevitably increase the computational complexity.

In step 905, the process is begun by setting the value of the variables as follows: $F_{max}=0$, $T_1, \ldots, T_m=1$, and $R_1, \ldots, R_M=1$ where the optimization parameters are choices of the service types $T_1, \ldots, T_m$ and the bit rates $R_1, \ldots, R_M$ for each new service line. The choice of service type is represented by 'T' and the choice of bit rate is represented by 'R'. N represents the number of new service lines in a specific binder in which M service lines have already been deployed.

In step 910, the process begins with a new service line being deployed. Depending on how many times the process is repeated, any number of new service lines may be deployed or only one new service line may be deployed.

In step 920, a service type is chosen. In one embodiment, the service type may be chosen by a service provider. Since only limited service types exist now and for each service type and only limited options of the bit rate can be deployed, the individual line performance optimization is finite dimensional. The optimization can be based on many decision criteria as mentioned before.

In step 930, a bit rate is chosen for the service type. In steps 940 and 945, a simulator simulates the new service line and the existing service lines in order to find the value of $$\sum_{i=1}^{N} BR_{i,j} \text{minus} \sum_{k=1}^{M} BRDrop_{k,i,j}.$$

An optimization goal may be to maximize BR and minimize BRDrop.

In step 950, in this embodiment, BR is used as the optimization criteria and the following cost function applies:

$$\max_{\substack{T_1,\ldots,T_N \\ R_1,\ldots,R_N}} f(T_1, \ldots, T_N, R_1, \ldots, R_N) =$$

$$\max_{\substack{T_1,\ldots,T_N \\ R_1,\ldots,R_N}} \left\{ \sum BR_{i,j} - \sum BRDrop_{k,i,j} \right\},$$

where the optimization parameters are choices of the service types $T_1, \ldots, T_N$ and the bit rates $R_1, \ldots, R_N$ for each new service line. It should be noted that the values of BR and BRDrop depend on not only the choice of one new service line but also the choices of all other new service lines. Therefore, BR and BRDrop are functions of $T_1, \ldots, T_N$, and $R_1, \ldots, R_N$.

In step 960, if f is greater than Fmax, the process moves to step 965 where f is set to be Fmax. If f is less than Fmax, the process moves to step 970 where the bit rate is changed and the process begins again at steps 940 and 945 using the new bit rate. Eventually, the process moves to steps 970 and 975 where the service type is changed and the new service type is put through the system beginning at step 920. In steps 980 and 985, more than one new service line may used in the optimization process by running the entire process from step 910 for each new service line. Optimization occurs when a given service type and bit rate is chosen for each new service line.

VII. FEASIBILITY ANALYSIS

Figure 10:
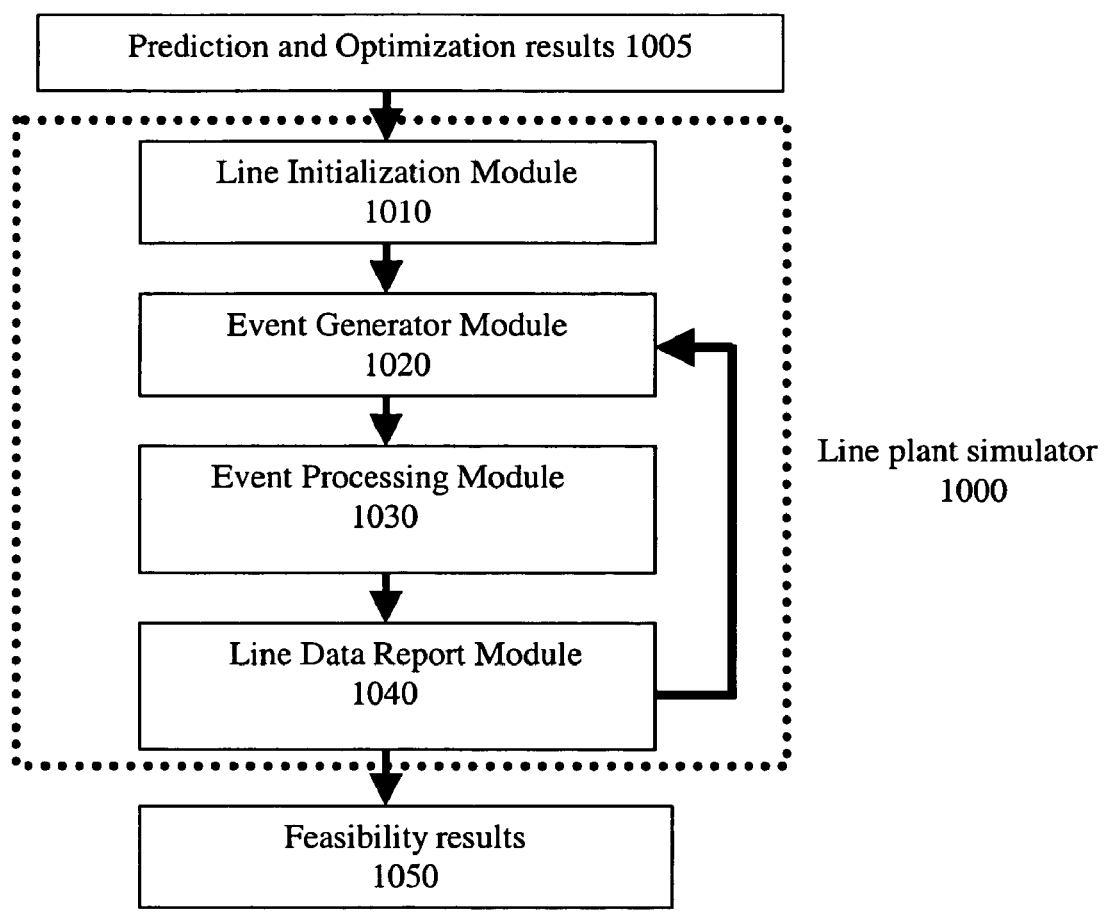
FIG. 10 shows an embodiment of a process for determining the feasibility of prediction and optimization results.

FIG. 10 shows an embodiment of a process for determining the feasibility of prediction and optimization results. A simulator may be used to simulate in detail the activity of a channel operated according to parameters taken from the results of a prediction and optimization analysis. In one embodiment, the simulator is a line plant simulator that is able to simulate in detail the activity of a service line. This embodiment is shown in FIG. 10.

The process begins in step 1005 where the results from the prediction and optimization analysis are fed into a line plant simulator 1000. The line plant simulator 1000 simulates the interference between DSL loops, AM radio interference, and the effect of temperature variation based on the spectrum analysis of different service types and different interferences.

Based on the measured crosstalk transfer functions and the spectrum transmission standards for different DSL service types, the line plant simulator 1000 is able to closely approximate the spectrum characteristics that are observed in the actual DSL system. The product of the line plant simulator 1000 is the loop performance fingerprint data such as SNR, loop attenuation, and transmit power for each in-domain DSL line as well as out-of-domain DSL lines.

The line plant simulator 1000 comprises a line initialization module 1010, an event generator module 1020, an event processing module 1030, and a line data report module 1140.

In one embodiment, the line initialization module 1010 creates a spectrum analysis model for each of a number of transmit service lines and for each of a number of different interferences. The event generator module 1020 then generates a number of events. The event processor module 1030 processes those events and computes a signal to noise ratio, a loop attenuation, and a transmit power for each service line based on the spectrum analysis model created by the line initialization module 1010. Finally, the line data report module 1040 reports data such as the signal to noise ratio, the loop attenuation, the transmit power and other related information such as forced training.

These results 1050 allow a service provider to take a set of parameters determined to be optimal by a prediction and optimization system and determine the feasibility of physically deploying that particular line. In another embodiment, results from only a prediction analysis may also be used by the line plant simulator 1000 to predict the feasibility of that particular line.

The invention claimed is:

1. A method for the prediction and optimization of a communications system comprising:
   inputting data from a plurality of channels into a prediction module of the communications system;
   predicting a performance of at least one of the plurality of channels using a plurality of parameters to characterize the performance of the at least one of the plurality of channels, wherein the parameters include a service type and bit error rate provided by a service provider;
   creating at least one transfer function model of the at least one of the plurality of channels, wherein the at least one transfer function model is simulated using physical configuration information of the communications system provided by the service provider;

optimizing the parameters of at least one of the plurality of channels in order to improve a bit rate of the at least one of the plurality of channels in the communications system, wherein the optimizing uses an optimization module of a spectrum management system; and providing the optimized parameters to a line plant simulator, the line plant simulator providing feasibility results.

2. The method claim 1 wherein predicting the performance of the at least one of the plurality of channels comprises:

inputting data from at least one channel of the communications system into a prediction module;

determining an impairment on the at least one channel;

characterizing the at least one channel using the at least one transfer function model and the impairment.

3. The method of claim 2 wherein the at least one transfer function model is simulated using a spectrum management system.

4. The method of claim 2 wherein the impairment is selected from the group consisting of: a cross-talk impairment, an AM radio interference, a temperature impairment, and any combination thereof.

5. The method of claim 1 wherein optimizing the parameters comprises:

a) choosing a first parameter for the at least one of the plurality of channels;

b) choosing a second parameter for the at least one of the plurality of channels;

c) determining an optimization criteria for the channel based upon the first parameter and the second parameter;

d) repeating a)-c) until the optimization criteria is optimized for the communications system.

6. The method of claim 1 wherein the communications system is a wireline communications system.

7. The method of claim 1 wherein the communications system is a wireless communications system.

8. The method of claim 1 wherein the communications system is an optical communications system.

9. The method of claim 1 wherein the communications system is a cable communications system.

10. The method of claim 1 wherein the communications system is a DSL communications system.

11. A system for the prediction and optimization of a communications system comprising:

a hardware prediction module, wherein the hardware prediction module predicts the performance of at least one channel in the communications system by providing a characterization of at least one parameter of a plurality of parameters that describes the at least one channel, wherein the plurality of parameters includes a service type and bit error rate provided by a service provider; and wherein the hardware prediction module creates at least one transfer function model of the at least one channel such that the at least one transfer function model is simulated using physical configuration information of the communications system provided by the service provider;

a hardware optimization module, wherein the hardware optimization module finds the optimum characterization for the at least one channel based on at least one design criteria; and a line plant simulator, wherein the line plant simulator provides feasibility results based on the optimum characterization.

12. The system of claim 11 wherein the design criteria are selected from the group consisting of: a cost of deployment, a signal to noise ratio, a total revenue, a bit rate, and any combination thereof.

13. The system of claim 11 wherein the communications system is a wireline communications system.

14. The system of claim 11 wherein the communications system is a wireless communications system.

15. The system of claim 11 wherein the communications system is an optical communications system.

16. The system of claim 11 wherein the communications system is a cable communications system.

17. The system of claim 11 wherein the communications system is a DSL communications system.

18. A method for the prediction and optimization of a communications system comprising:

inputting data from at least one channel into a prediction module of the communications system;

creating at least one transfer function model of the at least one channel, wherein the at least one transfer function model is simulated using physical configuration information of the communication system;

predicting a performance of the at least one channel using at least one parameter of a plurality of parameters to characterize the performance of the at least one channel, wherein the plurality of parameters include a service type and bit error rate provided by a service provider;

optimizing the at least one parameter of at least one channel in order to improve a bit rate of the at least one of the channels in the communications system, wherein the optimizing uses an optimization module of a spectrum management system; and providing the optimized parameters to a line plant simulator, the line plant simulator providing feasibility results.

19. The method claim 18 wherein predicting the performance of the at least one of the channels comprises:

inputting data from at least one channel of the communications system into a prediction module;

determining an impairment on the at least one channel;

characterizing the at least one channel using the at least one transfer function model and the impairment.

20. The method of claim 19 wherein the at least one transfer function model is simulated using a spectrum management system.

21. The method of claim 19 wherein the impairment is selected from the group consisting of: a cross-talk impairment, an AM radio interference, a temperature impairment, and any combination thereof.

22. The method of claim 18 wherein optimizing the at least one parameter comprises:

a) choosing a first parameter for the at least one channel;

b) choosing a second parameter for the at least one channel;

c) determining an optimization criteria for the at least one channel based upon the first parameter and the second parameter;

d) repeating a)-c) until the optimization criteria is optimized for the communications system.

23. The method of claim 18 wherein the communications system is a wireline communications system.

24. The method of claim 18 wherein the communications system is a wireless communications system.

25. The method of claim 18 wherein the communications system is an optical communications system.

26. The method of claim 18 wherein the communications system is a cable communications system.

27. The method of claim 18 wherein the communications system is a DSL communications system.

28. The method of claim 1, wherein optimizing the parameters of at least one of the plurality of channels comprises:

subjecting the optimization of the parameters to-at least one constraint selected from the group consisting of:

transfer functions and uncertainties, pricing as a function of service level, service type, spectral management rules, residential customers, home office customers, small business customers, general business customers, and combinations thereof.

29. The system of claim 11, wherein
the at least one design criteria is selected from the group consisting of: transfer functions and uncertainties, pricing as a function of service level, service type, spectral management rules, residential customers, home office customers, small business customers, general business customers, and combinations thereof.

30. The method of claim 18, wherein optimizing the at least one parameters of at least one of the plurality of channels comprises:
subjecting the optimization of the parameters to at least one constraint selected from the group consisting of: transfer functions and uncertainties, pricing as a function of service level, service type, spectral management rules, residential customers, home office customers, small business customers, general business customers, and combinations thereof.

* * * * *